United States Patent
Adamchuk et al.

(10) Patent No.: US 9,881,714 B2
(45) Date of Patent: Jan. 30, 2018

(54) LASER-MARKABLE INSULATION MATERIAL FOR WIRE OR CABLE ASSEMBLIES

(71) Applicant: SAINT-GOBAIN PERFORMANCE PLASTICS CORPORATION, Solon, OH (US)

(72) Inventors: Jennifer Adamchuk, Marlborough, MA (US); Kyle J. Killam, Bennington, VT (US); Frank M. Keese, Cambridge, NY (US); Gerald A. Elliott, Bennington, VT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 125 days.

(21) Appl. No.: 14/737,892

(22) Filed: Jun. 12, 2015

(65) Prior Publication Data

US 2016/0019997 A1 Jan. 21, 2016

Related U.S. Application Data

(60) Provisional application No. 62/014,393, filed on Jun. 19, 2014.

(51) Int. Cl.
*B32B 3/10* (2006.01)
*H01B 3/44* (2006.01)
(Continued)

(52) U.S. Cl.
CPC ............ *H01B 3/445* (2013.01); *C08K 3/22* (2013.01); *C08L 101/04* (2013.01); *H01B 3/002* (2013.01);
(Continued)

(58) Field of Classification Search
CPC ....................................... H01B 3/445
See application file for complete search history.

(56) References Cited

U.S. PATENT DOCUMENTS 4,335,180 A 6/1982 Traut
4,440,879 A 4/1984 Kawachi et al.
(Continued)

FOREIGN PATENT DOCUMENTS

CN 101629004 A 1/2010
EP 0329884 A1 8/1989
(Continued)

OTHER PUBLICATIONS

European Search Report issued in Application No. 15172610.6 dated Mar. 11, 2016, 2 pages.

*Primary Examiner* — Christopher Polley
(74) *Attorney, Agent, or Firm* — Abel Law Group, LLP; Thomas Osborn (57) ABSTRACT

The present disclosure is directed to laser-markable insulation material and cable or wire assemblies containing such insulation material. In certain embodiments, the laser-markable insulation material can include a fluoropolymer and an inorganic laser-markable pigment. The pigment can have a mean crystal size in a range of about 0.4 microns to about 2 microns and/or a median particle size ($d_{50}$) in a range of about 0.45 microns to about 2 microns. The insulation material can exhibit improved initial and heat-aged contrast ratios without diminishing the ability of a cable or wire containing the insulation material to meet industry standards for electric-arc tracking and propagation resistance.

18 Claims, 1 Drawing Sheet

(51) Int. Cl.
   *C08K 3/22* (2006.01)
   *C08L 101/04* (2006.01)
   *H01B 3/00* (2006.01)

(52) U.S. Cl.
   CPC ..... *H01B 3/004* (2013.01); *C08K 2003/2241* (2013.01); *C08L 2203/202* (2013.01)

(56) References Cited

U.S. PATENT DOCUMENTS

| | | |
|---|---|---|
| 4,808,966 A | 2/1989 | Ferlier et al. |
| 4,985,296 A | 1/1991 | Mortimer, Jr. |
| 4,996,097 A | 2/1991 | Fischer |
| 5,053,440 A | 10/1991 | Schueler et al. |
| 5,091,284 A | 2/1992 | Bradfield |
| 5,111,523 A * | 5/1992 | Ferlier .............. B44B 7/002 174/112 |
| 5,206,280 A | 4/1993 | Williams |
| 5,223,358 A | 6/1993 | Yamada et al. |
| 5,415,939 A | 5/1995 | Yeung |
| 5,501,827 A | 3/1996 | Deeney et al. |
| 5,560,845 A | 10/1996 | Birmingham, Jr. et al. |
| 5,630,979 A | 5/1997 | Welz et al. |
| 5,697,390 A | 12/1997 | Garrison et al. |
| 5,853,955 A | 12/1998 | Towfiq |
| 5,928,780 A | 7/1999 | Schmidt et al. |
| 6,218,000 B1 | 4/2001 | Rudolf et al. |
| 6,340,720 B1 | 1/2002 | Lin et al. |
| 6,391,104 B1 | 5/2002 | Schulz |
| 6,429,237 B1 | 8/2002 | Tooley |
| 6,503,310 B1 | 1/2003 | Sullivan |
| 6,617,515 B1 | 9/2003 | Yeung |
| 6,648,957 B1 | 11/2003 | Andes et al. |
| 6,702,971 B2 | 3/2004 | Huang et al. |
| 6,706,785 B1 | 3/2004 | Fu |
| 6,727,308 B2 | 4/2004 | Kniess et al. |
| 6,825,265 B2 | 11/2004 | Daga et al. |
| 6,987,224 B2 | 1/2006 | Yamamoto et al. |
| 7,008,989 B2 | 3/2006 | Sarkis et al. |
| 7,049,522 B2 | 5/2006 | Kim et al. |
| 7,169,471 B1 | 1/2007 | Dreher et al. |
| 7,187,396 B2 | 3/2007 | Carroll, Jr. et al. |
| 7,202,288 B2 | 4/2007 | Kniess et al. |
| 7,455,726 B2 | 11/2008 | Schoenefeld et al. |
| 7,850,775 B2 | 12/2010 | Hollman et al. |
| 2002/0082320 A1* | 6/2002 | Sarkis ................ B29C 71/04 523/220 |
| 2004/0077760 A1 | 4/2004 | Yeung |
| 2005/0269734 A1 | 12/2005 | Williams |
| 2007/0029294 A1 | 2/2007 | Peng |
| 2007/0039675 A1 | 2/2007 | Yeung |
| 2008/0014423 A1* | 1/2008 | Garrison ............. B29C 47/0004 428/220 |
| 2009/0016945 A1 | 1/2009 | Markmann et al. |
| 2009/0036585 A1 | 2/2009 | Markmann et al. |
| 2009/0090552 A1 | 4/2009 | Ferlier et al. |
| 2009/0250243 A1 | 10/2009 | Zhu et al. |
| 2010/0009171 A1* | 1/2010 | Greb .................. B29C 65/1677 428/328 |
| 2011/0071240 A1* | 3/2011 | Ding ...................... C08L 67/02 524/126 |
| 2012/0010345 A1 | 1/2012 | Edler et al. |
| 2013/0206452 A1 | 8/2013 | Janah et al. |
| 2013/0264090 A1 | 10/2013 | Cade et al. |

FOREIGN PATENT DOCUMENTS

| | | |
|---|---|---|
| EP | 0798333 A1 | 10/1997 |
| EP | 0875349 A1 | 11/1998 |
| EP | 1350818 A1 | 10/2003 |
| EP | 1285747 B1 | 10/2005 |
| EP | 1664172 B1 | 1/2007 |
| EP | 1560715 B1 | 10/2008 |
| EP | 1741749 B1 | 9/2010 |
| FR | 2617325 | 12/1988 |
| FR | 2648270 A1 | 12/1990 |
| GB | 1587850 A | 4/1981 |
| JP | H02281064 A | 11/1990 |
| JP | H04309548 A | 11/1992 |
| JP | 2000300984 A | 10/2000 |
| JP | 2005075667 A | 3/2005 |
| JP | 2005075674 A | 3/2005 |
| JP | 2005306033 A | 11/2005 |
| JP | 2007038423 A | 2/2007 |
| JP | 2007191563 A | 8/2007 |
| JP | 2009044018 A | 2/2009 |
| JP | 2009102541 A | 5/2009 |
| JP | 2009193732 A | 8/2009 |
| JP | 2010013520 A | 1/2010 |
| JP | 2010095396 A | 4/2010 |
| JP | 2010202787 A | 9/2010 |
| JP | 2010253755 A | 11/2010 |
| JP | 2010280106 A | 12/2010 |
| JP | 2011011535 A | 1/2011 |
| WO | 908805 | 8/1990 |
| WO | 9220526 | 11/1992 |
| WO | 9307627 | 4/1993 |
| WO | 01018824 A1 | 3/2001 |
| WO | 2005118254 A1 | 12/2005 |
| WO | 2008156948 A2 | 12/2008 |
| WO | 2009083934 A2 | 7/2009 |
| WO | 2009091479 A2 | 7/2009 |
| WO | 2010045274 A1 | 4/2010 |

* cited by examiner

LASER-MARKABLE INSULATION MATERIAL FOR WIRE OR CABLE ASSEMBLIES

CROSS-REFERENCE TO RELATED APPLICATION(S)

This application claims priority under 35 U.S.C. §119(e) to U.S. Provisional Patent Application No. 62/014,393 entitled, "LASER-MARKABLE INSULATION MATERIAL FOR WIRE OR CABLE ASSEMBLIES," by Adamchuk et al., filed on Jun. 19, 2014. Each patent application cited herein is hereby incorporated by reference in its entirety.

FIELD OF THE DISCLOSURE

The present disclosure relates to insulation material for wire or cable assemblies and more particularly to such insulation materials exhibiting improved initial and heat-aged contrast ratios.

RELATED ART

Fluorinated polymers, such as polytetrafluoroethylene (PTFE), are chemically inert materials having good electrical insulation properties and the ability to withstand high temperatures. Accordingly, fluoropolymers are used as electrical insulation in wire and cable assemblies. Non-melt-processable perfluoropolymers, such as PTFE or PTFE modified with a small percent of an alternative comonomer, are paste extruded to produce film, which is subsequently slit to produce narrow strips, i.e. tapes that are wrapped around a conductive core and sintered.

It is desirable to mark the surface of insulated wires and cables with identification inscriptions. Mark legibility may be quantified by a contrast ratio, which is a perceptual measure that defines the difference between the perceived darkness of the mark and the lightness of the insulation background. Laser irradiation can be used to produce dark, indelible marks on the surface of polymers containing CH functional groups. However, perfluoropolymers are ablated rather than carbonized under intense irradiation, and are therefore not inherently laser-markable.

It is known to incorporate additives into the polymer matrix that change color when the insulated wire is irradiated with laser energy, generating dark marks perceived in contrast to the light color of the surrounding insulation. Such marks are created by the laser beam without degrading the polymer matrix or significantly damaging the surface of the insulation. For example, colorless "white" pigment-grade titanium dioxide particles become bluish-black in color after absorbing ultraviolet (UV) laser light.

However, initial contrast ratios greater than 60% and heat-aged contrast ratios greater than 40% are difficult to achieve using titanium dioxide pigments and standard processing techniques well-known to the industry.

The darkness and durability of marks can be enhanced via the addition of UV-absorbing organic materials, including inorganic compounds containing organic functional groups. Such compounds thermally decompose to yield black carbon-based or inorganic residues. Fluoropolymers such as PTFE must be processed at temperatures up to and exceeding 360 degrees Celsius, at which point many organic additives are subject to thermal decomposition. Heat-stable UV-absorbing synergists suitable for processing at PTFE sintering temperatures have been proposed; however, such compounds readily decompose to produce conductive residues at extreme temperatures associated with electric-arc events and the extreme conditions to which the insulation is subjected to during electric-arc tracking and propagation testing.

Furthermore, such insulating tapes used in cables or wire assemblies must meet industry requirements for electric-arc tracking and propagation resistance. Polyimide wire insulation is commonly included in wire and cable assemblies used in aerospace applications due to its high dielectric strength and cut-through resistance. However, it is particularly vulnerable to pyrolization and arc tracking due to momentary short-circuit arcing events. If a momentary electrical short circuit occurs between two wires, sufficient heating of the polyimide can occur to thermally char (pyrolyze) the polyimide. Such charred polyimide has sufficient electrical conductivity to create an arc that tracks down the wires and possibly propagates to adjoining wires. In order to prevent catastrophic short-circuit arcing events that lead to arc tracking and propagation, the inner polyimide layer is protected by an outer layer of fluoropolymer insulation that does not char significantly during thermal decomposition. The ability of the insulation to withstand momentary short-circuit arcing events, and hence electric-arc tracking and propagation, is highly dependent upon the composition and integrity of the fluoropolymer insulation.

When standard processing conditions are employed, mark contrast generally improves with increasing amounts of titanium dioxide pigment before leveling off and ultimately decreasing. However, higher levels of titanium dioxide have been negatively correlated with electric-arc tracking and propagation resistance.

As such, a need exits to provide improved laser-markable fluoropolymer formulations with superior initial and heat-aged laser-mark contrast resolution achieved without compromising the heat stability or electric-arc tracking and propagation resistance of the insulation.

The current disclosure solves these and other problems due to the surprising discovery of a laser-markable insulation material that can improve initial and heat-aged contrast ratios and that does not compromise the heat-stability or electric-arc tracking and propagation resistance of the insulation. The mechanism by which the superior contrast-ratio performance of the new insulation material is achieved synergistically affords unexpectedly good electric-arc tracking and propagation resistance of insulated wire and cable assemblies.

BRIEF DESCRIPTION OF THE DRAWINGS

Embodiments are illustrated by way of example and are not limited in the accompanying figures.

Those skilled in the art will appreciate that elements in the figures are illustrated for simplicity and clarity and have not necessarily been drawn to scale. For example, the dimensions of some of the elements in the figures may be exaggerated relative to other elements to facilitate understanding of the embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the insulating tape and cable/wire arts.

Figure 1:
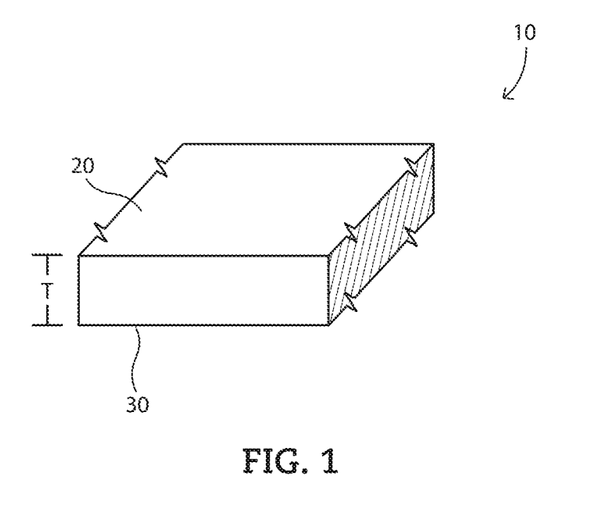
FIG. 1 includes an illustration of a perspective view of a section of laser-markable insulation material according to one embodiment of the present disclosure.

Embodiments of the present disclosure are generally directed to insulation materials designed for use in wire or cable assemblies exhibiting improved initial and heat-aged laser-mark contrast and enabling wire and cable assemblies containing these insulation materials to meet industry requirements for electric-arc tracking and propagation resistance. Referring now to FIG. 1, an insulation material 10 can include a polymer-based layer 15 having a first major surface 20 and a second major surface 30 opposite the first major surface 20.

In certain embodiments, the insulation material can include or even consist essentially of a polymer material and a laser-markable pigment.

In certain embodiments, the polymer material can include or even consist essentially of one or more fluoropolymers. Particular fluoropolymers can include, for example, polytetrafluoroethylene (PTFE), perfluoroalkoxy copolymer (PFA); ethylene tetrafluoroethylene copolymer (ETFE); polychlorotrifluoroethylene (PCTFE); fluorinated ethylene propylene copolymer (FEP); polyvinylidene fluoride (PVDF); amorphous fluoropolymer (AF); and ethylene chlorotrifluoroethylene (ECTFE); or combinations thereof.

In further particular embodiments, the polymer material can include or even consist essentially of one or more perfluoropolymers.

In still even further particular embodiments, the polymer material can include or even consist essentially of one or more non-melt-processable polymers or copolymers, such as homopolymer PTFE, modified PTFE, or combinations thereof. Suitable examples of non-melt-processable fine powder PTFE resins designed for use in lubricated extrusion are DuPont™ Teflon® T60, 613A, Daikin POLYFLON™ F104, F301, F302, F304, Solvay Algoflon® DF130, DF230, DF261, and Dyneon™ TF 2025z, TF2029z.

In very particular embodiments, the polymer material can be essentially free of a fluorinated copolymer, such as modified fine powder PTFE. In other particular embodiments, the polymer material can contain no greater than about 80 wt. %, no greater than about 70 wt. %, no greater than about 60 wt. %, no greater than about 50 wt. %, no greater than about 40 wt. %, no greater than about 30 wt. %, no greater than about 25 wt. %, no greater than about 20 wt. %, no greater than about 15 wt. %, no greater than about 10 wt. %, no greater than about 5 wt. %, or even no greater than about 3 wt. % of a fluorinated copolymer such as modified PTFE, based on the total weight of the polymer material.

In other very particular embodiments, the polymer material can include or even consist essentially of a non-melt-processable fluorinated copolymer, such as a modified PTFE.

In certain embodiments, the polymer material can include a mixture of non-melt-processable resins, such as a mixture of a first non-melt-processable resin and a second non-melt-processable resin, where the first and second non-melt-processable resins are different. In certain embodiments, the first non-melt-processable resin can include or even consist essentially of a homopolymer, such as homopolymer PTFE. In further embodiments, the second non-melt-processable resin can include or even consist essentially of a fluorinated copolymer. In certain embodiments, the ratio of the first non-melt-processable resin to the second non-melt-processable resin can be at least about 1:9, at least about 3:7, at least about 4:6, at least about 5:5, at least about 6:4, or even at least about 8:2. In further embodiments, the ratio of the first non-melt-processable resin to the second non-melt-processable resin can be no greater than about 9:1, no greater than about 8:2, no greater than about 6:4, no greater than about 4:6, no greater than about 3:7, no greater than about 2:8, or even no greater than about 1:9. In still further embodiments, the ratio of the first non-melt-processable resin to the second non-melt-processable resin can be in a range of any of the minimum and maximums provided above, such as in a range of about 1:9 to about 9:1.

Resin type may be determined by a combination tests that are well known to those skilled in the art, including Differential Scanning calorimetry (DSC), Fourier Transform Infrared Spectroscopy (FTIR), and Raman Spectroscopy. The physical properties and integrity of the insulation and the void structure at the surface of sintered insulation may also be used to distinguish resin type.

The insulation material can also include one or more laser-markable pigments. As used herein, the phrase "laser-markable pigment" refers to a pigment that, when irradiated with laser light, undergoes a structural transformation that changes the color of the pigment or produces a dark-colored decomposition product. In particular embodiments, the laser-markable pigment can include a UV-laser-markable pigment.

The laser-markable pigment can be present in any desired amount. In particular embodiments, the laser-markable pigment can be present in the insulation material in an amount of at least about 0.5 pph, at least about 0.8 pph, at least about 1.0 pph, at least about 1.2 pph, at least about 1.3 pph, or even at least about 1.5 pph. In further embodiments, the laser-markable pigment can be present in the insulation material in an amount of no greater than about 5 pph, no greater than about 4 pph, no greater than about 3.4 pph, no greater than about 3.2 pph, no greater than about 3.0 pph, no greater than about 2.8 pph, no greater than about 2.6 pph, no greater than about 2.5 pph, no greater than about 2.4 pph, no greater than about 2.2 pph, no greater than about 2.0 pph, no greater than about 1.8 pph, no greater than about 1.5 pph, or even no greater than about 1.3 pph. In still further embodiments, the laser-markable pigment can be present in the insulation material in an amount in a range of any of the minimum and maximums provided above, such as in a range of about 0.5 pph to about 3.0 pph, about 1.0 pph to about 2.8 pph, or even about 1.0 pph to about 2.5 pph.

A particular advantage of the present disclosure is the achievement of the performance parameters described herein, such as excellent initial and heat-aged contrast ratios, at a low concentration of laser-markable pigment as illustrated by the Examples below. The concomitance of these improvements was unexpected. For example, in prior attempts, high laser-markable pigment loadings, such as 3.5-4.5 pph, were required in order to obtain satisfactory initial and heat-aged contrast ratios. However, as detailed herein, it was surprisingly discovered that satisfactory initial and heat-aged contrast ratios could be achieved with low laser-markable-pigment loading as described above. Further, without wishing to be bound by theory, it is believed that a lower loading of laser-markable pigment can synergistically improve the electric-arc tracking and propagation resistance of insulated wire and cable assemblies as described in more detail below.

In certain embodiments, the laser-markable pigment can include or even consist essentially of an inorganic laser-markable pigment. As used herein, the phrase "inorganic laser markable-pigment" refers to laser-markable pigments that have an inorganic core. Particular inorganic laser-markable pigments can include inorganic laser-markable pigments such as metal-oxide-based inorganic laser-markable particles.

In certain embodiments, the inorganic laser-markable particles can include or even consist essentially of a metal oxide. In particular embodiments, the metal oxide can include $TiO_2$, $Cr_2O_3$, $NiO$, $V_2O_5$, $Fe_2O_3$, $CuO$, $CdO$, $Tl_2O_3$, $CeO_2$, $Nb_2O_5$, $MoO_3$, $WO_3$, $Sb_2O_3$, $SnO_2$, $ZrO$, $ZnO_2$, or combinations thereof. It is to be understood that the metal oxides described herein, such as $TiO_2$, include metal oxides that are doped, undoped, or combinations thereof. In very particular embodiments, the metal oxide can include or even consist essentially of $TiO_2$, doped $TiO_2$, or combinations thereof. The $TiO_2$-based particle core may have an anatase crystal structure, brookite crystal structure, rutile crystal structure, or a combination thereof. In very particular embodiments, the $TiO_2$-based particle core can include or even consist essentially of rutile $TiO_2$. Specific examples of $TiO_2$ pigments can include those $TiO_2$ pigments described in U.S. Pat. No. 5,560,845, and U.S. Pat. No. 6,429,237, both of which are incorporated herein by reference for all useful purposes.

In other embodiments, the inorganic laser-markable pigment can include a non-metal-oxide, such as ZnS, CdS, CdSSe, and CeS.

The composition of an inorganic pigment may be determined by SEM-EDS elemental analysis or X-ray fluorescence spectroscopy. SEM-EDS elemental analysis may be performed using a Nanoscience Instruments, Inc. Phenom ProX Benchtop Scanning Electron Microscope, and X-ray fluorescence spectroscopy may be performed using a Shimadzu EDX-7000/8000 Energy Dispersive X-ray Fluorescence Spectrometer. The crystal structure can be determined by X-ray diffraction using, for example, a Bruker Corporation D8 ADVANCE ECO™ X-Ray Diffraction System. Depending on the composition of the pigment, various methods known in the art may be used to measure pigment loading levels. In a particular embodiment in which a $TiO_2$-based pigment is dispersed in a non-melt-processable fluoropolymer insulation material, the percent $TiO_2$ may be determined performing a fusion of the sample with lithium tetraborate in muffle furnace at 1000 degrees Celsius for 5 hours followed by dissolution of the fuseate with HCl. Inductively Coupled Plasma Mass Spectrometry (ICP-MS) is then used to determine the identity and loading of components in the sample.

In certain embodiments, the laser-markable pigment can have a particular particle size. As used herein, the phrase "particle size" when used in describing the laser-markable pigment includes both the crystal size and the coating size, if present. Furthermore, it is to be understood that crystal size is distinct from particle size because particles may be comprised of more than one crystal or clumped together. The particle size also depends on the effectiveness of the deagglomeration and dispersion of the laser-markable particles within the polymer matrix. Thus, the particle size can depend on the crystal size as well as milling techniques, such as air-jet milling, dry milling, wet milling, or incorporative milling.

The particle-size distribution (PSD) is a list of values that defines the relative amount, typically by mass, of particles present according to size (diameter). As referenced herein, "particle-size distribution" refers to the PSD weighted by mass or volume, since that the mass of generally homogenous particles having a relatively narrow particle size distribution is roughly proportional to the volume occupied by such particles.

In certain embodiments, the laser-markable pigment can have a median particle size ($d_{50}$) of at least 0.4 microns, at least about 0.45 microns, at least about 0.5 microns, at least about 0.6 microns, at least about 0.7 microns, at least about 0.8 microns, or even at least about 0.9 microns. In further embodiments, the laser-markable pigment can have a median particle size ($d_{50}$) of no greater than about 3.0 microns, no greater than about 2.5 microns, no greater than about 2.0 microns, no greater than about 1.8 microns, no greater than about 1.6 microns, no greater than about 1.4 microns, no greater than about 1.2 microns, no greater than about 1.0 micron, or even no greater than 0.8 microns. In still further embodiments, the laser-markable pigment can have a median particle size ($d_{50}$) in a range of any of the minimum and maximums provided above, such as in a range of 0.4 microns to about 3.0 microns, about 0.45 microns to about 2.5 microns, about 0.5 microns to about 1.8 microns, or even about 0.6 microns to about 1.6 microns.

The median particle size ($d_{50}$) can be measured by well known techniques in the art using commercially available instruments such as a Horiba Laser Scattering Particle Size Distribution Analyzer LA-950, available from Horiba Ltd., a BI-XDC X-ray Disk Centrifuge, available from Brookhaven Instruments Corporation, or a CPS Disc Centrifuge DC 24000, available from CPS Instruments Inc.

A particular advantage of certain embodiments of the present disclosure is the discovery that the particular median particle size range described above aided in improving the initial and heat-aged contrast ratios for formulations comprised of various resin grades and low pigment loadings as well as the ability of insulated wire to meet industry requirements for electric-arc tracking and propagation resistance. For example, traditional industry practice was to use a pigment having a small particle size, such as less than about 0.4 microns.

The particle size range of an inorganic pigment dispersed in a fluoropolymer insulation material may be determined by Scanning-Electron-Microscopy (SEM) image analysis. $TiO_2$ particles present at the surface of the insulation can be imaged using a Carl Zeiss® Merlin high-resolution SEM system with Electron backscatter diffraction (EBSD) to define the perimeter of partially embedded particles, and image analysis may be performed using a Carl Zeiss® KS300 Image Analyser, both of which are commercially available from Zeiss International. Alternatively, crystal size may be imaged using a using a Tecnai TF20 200 kV FEG high resolution Transmission Electron Microscope (TEM), which is available from FEI Company. In order to achieve more accurate results, the surface of the fluoropolymer may be partially ablated under vacuum using a method that does not significantly alter the dimensions or crystal size of the inorganic pigment. Examples of such methods are oxygen plasma treatment, electron-beam bombardment, gamma irradiation, and $CO_2$ laser beam ablation. Accordingly, the surface of PTFE-based insulation can be ablated using oxygen plasma generated with RF power>400 W. Alternatively, the surface can be ablated using an electron beam current density of about $8 \times 10^4$ $A/m^2$ for bombardment of the sample. As a further option, the surface can be ablated with a continuous $CO_2$ laser beam of 30-50 W at a mean intensity of 0.05-50 MW $m^{-2}$.

In certain embodiments, the laser-markable pigment can also have a particular average crystal size. For example, in particular embodiments, the laser-markable pigment can have an average crystal size of at least at least about 0.4 microns, at least about 0.5 microns, at least about 0.6 microns, or even at least about 0.7 microns. In further embodiments, the laser-markable pigment can have an average crystal size of no greater than about 2 microns, no greater than about 1.5 microns, no greater than about 1.3 microns, no greater than about 1.1 microns, no greater than about 0.9 microns, no greater than about 0.8 microns, or even no greater than about 0.7 microns. Moreover, in certain embodiments, the laser-markable pigment can have a crystal size within a range of any of the minimum and maximum values provided above, such as in a range of from about 0.4 microns to about 2.0 microns, about 0.5 microns to about 1.5 microns, or even about 0.6 to about 0.7 microns.

Average crystal size may be determined by performing image analysis on a transmission electron microscopy (TEM) photograph/electron micrograph of the sample of a finished insulation material. For example, TEM images may be obtained using a Tecnai TF20 200 kV FEG high resolution Transmission Electron Microscope (TEM), which is available from FEI Company, and image analysis may be performed using a KS300 Image Analyzer, which is commercially available from Zeiss International. Crystal size measurements may be validated by reference to the latex NANOSPHERE™ size standard 3200 from NIST with a certified size of 199±6 nm.

A particular advantage of certain embodiments of the present disclosure is the discovery that the particular crystal size values provided above assisted in improving the performance of the insulation material, and in particular, improving the contrast ratio of the insulation material while maintaining the ability of the insulated wire to meet industry requirements for electric-arc tracking and propagation resistance as discussed in more detail below.

In particular embodiments, the laser-markable pigment can have a particular ratio of median particle size to mean crystal size. For example, the laser-markable pigment can have a ratio of median particle size to mean crystal size of no greater than about 3:1, no greater than about 2:1, no greater than about 1.8:1, no greater than about 1.6:1, no greater than about 1.4:1, no greater than about 1.3:1, or even no greater than about 1.2:1.

In certain embodiments, the laser-markable pigment can include a coating. In particular embodiments, the laser-markable pigment can include inorganic coatings such as a silica-based coating, a metal-based coating, oxides thereof, or combinations thereof. In very particular embodiments, the laser-markable pigment can include a silica-based coating, such as hydrated, amorphous (glass-like), or semi-crystalline $SiO_2$. In further particular embodiments, the laser-markable pigment can include an alumina-based coating, such as hydrated, amorphous, or semicrystalline $Al_2O_3$. In very particular embodiments, the laser-markable pigment can include both silica- and alumina-based coatings.

In further particular embodiments, the laser-markable pigment can include a heat-stable organic coating. For example, suitable heat-stable organic coatings can include polysiloxane-based coatings and/or fluorinated organic coatings.

The particular type of laser-markable pigment (including coating materials) and other additives designed to improve the contrast ratio that are included in the insulation material formulation can also be described by their ability to remain stable at the processing temperature of the polymer material, and in certain embodiments, at the sintering temperature of a non-melt-processable fluoropolymer resin such as PTFE. For example, in the production of wire and cable assemblies insulated with PTFE tape, it is necessary to sinter the insulation in the wire or cable assembly at temperatures around 340 to 400 degrees Celsius. Accordingly, in certain embodiments, the laser-markable pigment (including coating material) and/or other additives are stable at the processing temperature of the polymer material, and in certain embodiments, at the sintering temperature of fluoropolymer resins such as PTFE. Furthermore, in certain embodiments, the laser-markable pigment (including coating material) and/or other additives can be essentially free of a material that is not stable at sintering temperatures. In very particular embodiments, the laser-markable pigment (including coating material) and/or other additives can be essentially free of a material that is not stable at extreme temperatures associated with electric-arc events.

As described herein, the presence of an organic material (or other material that cannot withstand temperature of about 340 to 400 degrees Celsius) can introduce conductive impurities and compromise the physical integrity of the insulation. A particular advantage of certain embodiments of the present disclosure is the joint improvement of initial and heat-aged contrast ratios despite the absence of carbonizable organic materials. While organic synergists may enhance contrast, degradation of such materials during processing or exposure to pre-arc scintillations may have a detrimental effect on electric-arc tracking and propagation resistance.

In certain embodiments, the insulation material can include a first laser-markable pigment and a second pigment, wherein the first laser-markable pigment and second pigment are different. For example, in certain embodiments, the first laser-markable pigment can be any of the laser-markable pigments described above.

In certain embodiments, the second pigment can be adapted to improve the background luminescence of the polymer material. For example, the second pigment can be a conventional white pigment.

In particular embodiments, the second pigment can have a lower median particle size (d50) than the first laser-markable pigment. For example, in very particular embodiments, the second pigment can have a median particle size (d50) in a range of from about 0.1 microns to about 0.5 microns, or even about 0.2 microns to about 0.4 microns.

The second pigment can be present in the insulation material in any desired amount. In particular embodiments, the second pigment can be present in the insulation material in an amount of at least about 0.01 pph, at least about 0.05 pph, or even at least about 0.1 pph. In further embodiments, the second pigment can be present in the insulation material in an amount of no greater than about 1.0 pph, no greater than about 0.8 pph, or even no greater than 0.5 pph. In still further embodiments, the second pigment can be present in the insulation material in an amount in a range of any of the minimum and maximums provided above, such as in a range of about 0.01 pph to about 1.0 pph, about 0.05 pph to about 0.8 pph, or even about 0.1 pph to about 0.5 pph.

In certain embodiments, the second pigment can include or even consist essentially of an inorganic pigment. As used herein, the phrase "inorganic pigment" refers to pigments that have an inorganic core. Particular inorganic pigments can include metal-oxide-based particles.

In certain embodiments, the inorganic second pigment can include or even consist essentially of a metal oxide. In particular embodiments, the metal oxide can include $TiO_2$, $Cr_2O_3$, $NiO$, $V_2O_5$, $Fe_2O_3$, $CuO$, $CdO$, $Tl_2O_3$, $CeO_2$, $Nb_2O_5$, $MoO_3$, $WO_3$, $Sb_2O_3$, $SnO_2$, $ZrO$, $ZnO_2$, or combinations thereof. In very particular embodiments, the metal oxide can include or even consist essentially of $TiO_2$.

A particular advantage of certain embodiments of the present disclosure is the unexpected discovery that the addition of a second, conventional white pigment to the insulation material formulation described herein can result in improved contrast ratios while satisfactorily maintaining the electric-arc tracking and propagation resistance of the insulated wire. Moreover, it was unexpected that the combination of pigments could synergistically improve the contrast ratio, particularly at low loadings.

In certain embodiments, the laser-markable pigment and/or fluoropolymer/pigment mixtures can be an air jet milled to enhance particle breakup and dispersion, which can lead to improvements in contrast ratio and electric-arc tracking and propagation resistance. For example, the laser-markable pigment and/or fluoropolymer/pigment mixtures can be air-jet milled using an Alpine AFG Fluidized Bed Jet Mill available from Hosokawa Inc. or a Roto-Jet™ Fluid Bed Jet Mill available from Fluid Energy Inc. Insulation which has been air-jet milled is clearly distinguishable by the homogeneity of the pigmentation.

In other embodiments, the laser-markable pigment and/or fluoropolymer/pigment formulations can be processed using traditional methods that do not require highly-specialized milling equipment. For example, the laser-markable pigment may be dispersed in paraffin oil using a high-shear blender and mixed with PTFE resin in a jar mill, cement mixer (panning mixer), or PK blender. When standard mixing techniques are employed, pigment-rich striations are observable only upon close inspection of the insulation.

A particular advantage of certain embodiments of the present disclosure is the unexpected discovery that superior contrast ratios can be obtained when the insulation material is processed using the traditional methods described above. Such methods fail to optimize particle dispersion at the PTFE particle level due to the agglomerated state of these particles in coagulated fine powder resin. Previously, $TiO_2$ particles had to be dispersed at the PTFE particle level in order for high contrast ratios to be obtained. Low-shear milling methods such as air-jet milling, which are capable of breaking up the PTFE agglomerates without damaging the resin, which is highly prone to fibrillation when sheared, were required to achieve the level of $TiO_2$ particle dispersion necessary for attaining sufficiently high contrast ratios.

The insulation material can further include any additional additives as understood in the art. For example, the insulation material or the composition used to form the insulation material can contain additives such as surfactants, anti-static additives, extrusion aids, colored pigments, or combinations thereof.

Referring again to FIG. 1, in certain embodiments, the insulation material can have any desirable thickness T. In particular embodiments, the insulation material can have an average (nominal) thickness T of at least about 0.0005 inches, at least about 0.001 inches, or even at least about 0.0015 inches. In further embodiments, the insulation material can have an average (nominal) thickness T of no greater than about 0.005 inches, no greater than about 0.004 inches, no greater than about 0.003 inches, or even no greater than about 0.0025 inches. In still further embodiments, the insulation material can have an average (nominal) thickness T in a range of any of the minimum and maximum values provided above, such as in a range of about 0.0005 inches to about 0.004 inches, or even about 0.0015 inches to about 0.0025 inches.

In certain embodiments, the insulation material can have an advantageous contrast ratio, and particularly both an advantageous initial contrast ratio and an advantageous heat-aged contrast ratio. The contrast ratio is a measure of the difference in luminescence of the insulation background and the mark compared to the luminance of the insulation background. Contrast ratio is a well-understood measurement in the art. As used herein, the contrast ratio can be determined according to the following equation:

$$C=[(L_b-L_m)/L_b]\times 100\%$$

where C represents the contrast ratio, $L_b$ represents the luminance of the background material, and $L_m$ represents the luminance of the mark. In the above equation, luminescence is defined as "the quantitative measurement of the visible light reflected from a surface." The luminance is determined by a calibrated electrical photometer which incorporates a photopic filter to simulate the response of the human eye.

Contrast Ratio Sample Test Construction 1

As used herein, the phrase "Contrast Ratio Sample Test Construction 1" refers to contrast measurements conducted in accordance with the requirements stated in SAE AS4373D *Test Methods for Insulated Electric Wire—Method* 1001, *Wire Marking Contrast* on a mock-up construction. Flexible or semi-rigid elongated cylindrical samples with a constant diameter between 0.01 and 0.6 inches are prepared. In certain embodiments, DSC analysis is performed to ensure that the sintered insulation meets the requirements of SAE AS4373 Method 813 or EN 3475-414. In particular embodiments, DSC analysis is performed to ensure that the difference in energy to melt between the first and second heats is less than 3 Joules/gram.

The samples are then marked using a Spectrum Technologies CMS CAPRIS 50-100 laser-marking system, which employs a solid-state Longbow™ UV Nd:YAG laser (355 nm) with a fluence of 0.9 $J\cdot cm^{-2}$. Contrast ratio is measured for solid-dot characters (●) using a CMS 2 contrast-measurement system, also manufactured by Spectrum Technologies, Inc.

As provided above, the insulation material described herein can have an advantageous initial contrast ratio. In certain embodiments, the insulation material can have an initial contrast ratio of at least about 55%, at least about 57%, at least about 60%, at least 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, or even at least about 75% as measured according to Contrast Ratio Sample Test Construction 1. In further embodiments, the insulation material can have an initial contrast ratio of no greater than about 99%, no greater than about 90%, or even no greater than about 85% as measured according to Contrast Ratio Sample Test Construction 1. In still further embodiments, the insulation material can have an initial contrast ratio in a range of any of the minimum and maximums provided above, such as in a range of about 55% to about 99%, about 60% to about 99%, about 65% to about 90%, or even about 70% to about 90% as measured according to Contrast Ratio Sample Test Construction 1.

As provided above, the insulation material described herein can have an advantageous heat-aged contrast ratio. As used herein, the heat-aged contrast ratio refers to the contrast ratio as outlined above and tested on a sample that has been heat aged for 168 hours at a temperature in a range of 260 degrees Celsius to 310 degrees Celsius. In certain embodiments, the insulation material can have a heat-aged contrast ratio of at least about 40%, at least about 41%, at least about 42%, at least about 43%, at least about 44%, at least about 45%, at least about 46%, at least about 47%, at least about 48%, at least about 49%, at least about 50%, at least about 51%, at least about 52%, at least about 53%, at least about 54%, at least about 55%, at least about 56%, at least about 57%, at least about 58%, at least about 59%, or even at least about 60% as measured according to Contrast Ratio Sample Test Construction 1. In further embodiments, the insulation material can have a heat-aged contrast ratio of no greater than about 99%, no greater than about 90%, or even no greater than about 85% as measured according to Contrast Ratio Sample Test Construction 1. In still further embodiments, the insulation material can have a heat-aged contrast ratio in a range of any of the minimum and maximum values provided above, such as in a range of about 40% to about 99%, about 45% to about 90%, or even about 50% to about 90% as measured according to Contrast Ratio Sample Test Construction 1.

As described throughout this document, the inventors surprisingly discovered a simple synergistic means for producing an insulation material having improved initial and heat-aged contrast ratios despite the absence of char-producing, pyrolizable organic synergists that also meets the industry requirements for electric-arc tracking and propagation resistance. Accordingly, in certain embodiments, the insulation material can be essentially free of char-producing, pyrolizable organic synergists.

Figure 2:
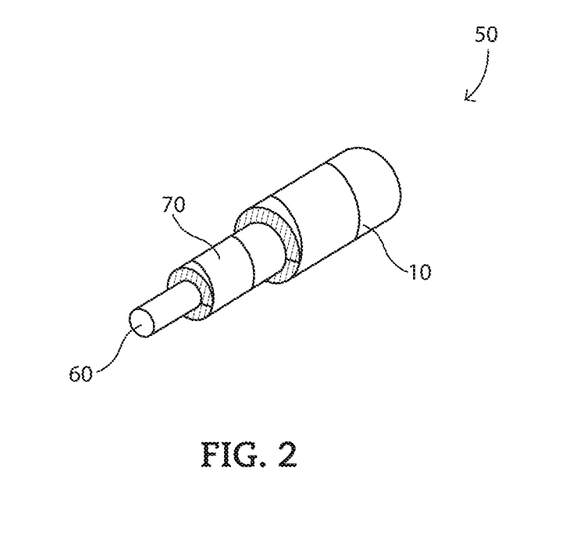
FIG. 2 includes an illustration of a perspective view of a cable or wire assembly containing an insulation member according to one embodiment of the present disclosure.

Referring now to FIG. 2, another aspect of the disclosure is directed to cable or wire assembly 50 containing an embodiment of the insulation material 10 described above. For example, as illustrated in FIG. 2, a cable or wire assembly 50 can include a transmission member 60 and a plurality of insulation members 10, 70 adapted to protect the transmission member and the cable or wire assembly 50 as a whole. It is to be understood that the laser-markable insulation material 10 can contain any embodiment of the laser-markable insulation material described herein.

Insulation member 70 can be any insulation material desired in the art. For example, insulation member 70 can contain a composite film. In very particular embodiments, insulation member 70 can contain a composite comprised of a polyimide layer and a fluoropolymer layer. In very particular embodiments, insulation member 70 can be pigmented to improve the background luminescence of the laser-markable insulation material 10.

The cable or wire assembly 50 can further contain any additional layers as is useful for the particular application and as is understood in the art.

As discussed above, the insulation material can have an advantageous contrast ratio. In the same regard, the cable or wire assembly containing the insulation material can also have an advantageous contrast ratio, in particular both an advantageous initial contrast ratio and an advantageous heat-aged contrast ratio. As such, in certain embodiments, the wire or cable assembly can have any of the initial and/or heat-aged contrast ratio values listed above with respect to the insulation material except measured according to any of the Contrast Ratio Tests described below. A standardized process for measuring the contrast ratio of a laser-marked insulating material (i.e. tape) that has been incorporated into a wire assembly may be conducted according to the guidelines of any one of Contrast Ratio Sample Test Construction 1, Contrast Ratio Sample Test Construction 2, Contrast Ratio Sample Test Construction 3, Contrast Ratio Sample Test Construction 4, and/or Contrast Ratio Sample Test Construction 5.

Contrast Ratio Sample Test Construction 2

Samples are prepared and analyzed according to the guidelines of Contrast Ratio Sample Test Construction 1. Specifically, an unpigmented 2.0 mil thick heat-sealable fluoropolymer (0.5 mil)/polyimide (1.0 mil)/fluoropolymer (0.5 mil) composite tape (0.25 inches wide), such as Fluorowrap® DF1020NAT, commercially available from Saint-Gobain Performance Plastics Corporation, is helically wrapped over the length of a 12 inch stainless steel rod with a diameter of 1.5 millimeters using approximately 53% overlap. The 2.0 mil thick laser-markable insulation material is cut to a width of 0.25 inches and helically wrapped with a loading of 223 grams over the polyimide composite layer using approximately 53% overlap. The insulation material-wrapped rods are then sintered at 388 degrees Celsius for 5 minutes in a convection oven.

Contrast Ratio Sample Test Construction 3

Contrast Ratio Sample Test Construction 3 is identical to Contrast Ratio Sample Test Construction 2, except that one or more of the fluoropolymer layers in the polyimide composite contains $TiO_2$ pigment. For example, in the Contrast Ratio Test 3 described herein, the laser-markable insulation material may be wrapped over a pigmented polyimide composite such as Fluorowrap® DF2919WHT, which is commercially available from Saint-Gobain Performance Plastics Corporation.

Contrast Ratio Sample Test Construction 4

Contrast Ratio Sample Test Construction 5 is identical to Contrast Ratio Sample Test Construction 2, except that a 126 gram weight is used instead of a 223 gram weight.

Contrast Ratio Sample Test Construction 5

Contrast Ratio Sample Test Construction 5 is identical to Contrast Ratio Sample Test Construction 4, except that the sample construction does not contain a polyimide composite layer, and the laser-markable insulation material is helically wrapped directly on the 1.5 mm stainless steel rod using 126 gram loading.

In certain embodiments, the wire or cable assembly insulated with laser-markable insulation material may be characterized by any of the initial and/or heat-aged contrast ratios listed above when measured in accordance with Contrast Ratio Tests 2-5.

A cable or wire containing the insulation material described herein can also have an advantageous electric-arc tracking and propagation resistance. In order to assess the positive impact of the insulation material formulations described herein on the electric-arc tracking and propagation resistance of a wire or cable assembly, sample constructions of insulated wire can be constructed and compared. Described below are various sample wire constructions that may be used to test the ability of the sintered laser-markable insulation to prevent electric-arc tracking and propagation in a wire or cable assembly.

Sample Wire Test Construction 1a and 1b

Sample wire construction 1a consists of a 20 AWG stranded (19×32 AWG strands) nickel-coated copper conductor core with a diameter between 0.365 inches and 0.394 inches available from Leoni Wire Inc. A 2.0 mil thick heat-sealable composite tape, such as DuPont™ Oasis™ 200TRT515, commercially available from E.I. DuPont de Nemours and Company, which consists of a 1.0 mil polyimide layer surrounded by two 0.5 mil fluoropolymer layers, is helically wrapped around the nickel-coated copper conductor core with approximately 53% overlap. The 2.0 mil thick laser-markable insulation material is helically wrapped over the sealable composite tape with approximately 53% overlap. The tapes are wrapped using dual concentric taping heads with photoelectric-eye package-diameter sensors controlling the voltage supplied to magnetic hysteresis brakes to reduce braking torque as the package diameter decreases, maintaining constant wrapping tension. The wire is then sintered in a two-zone vertical IR oven consisting of two approximately six-foot-long Glenro (Paterson, N.J.) "Radaround" radiant process heaters, with both zones operating at 593 degrees Celsius. The wire is drawn through the oven at a rate of 50 feet per minute. DSC analysis is performed to ensure that the sintered insulation meets the requirements of SAE AS4373 4.8.13 Method 813 and EN 3475-414, and that the difference in energy to melt between the first and second heats is less than 3 Joules/gram.

Sample wire construction 1b is exactly the same as sample wire test construction 1a, except the conductor core is a 22 AWG nickel-coated copper conductor.

Sample Wire Test Constructions 2a, 2b, and 2c

Sample Wire Test Constructions 2a and 2b are exactly the same as Sample Wire Test Construction 1a, except that the polyimide composite in Sample Wire Test Construction 2a is DuPont™ Kapton® 200FWR919, commercially available from E.I. DuPont de Nemours and Company, and the polyimide composites in Sample Wire Test Construction 2b and 2c are FluoroWrap® DF2919NAT and FluoroWrap® DF2919WHT, commercially available from Saint-Gobain Performance Plastics Corporation. DF2919NAT is not pigmented, and DF2919WHT is pigmented white.

Sample Wire Test Construction 3

Sample Wire Test Construction 3 is exactly the same as Sample Wire Test Construction 1a, except that the polyimide composite in Sample Wire Test Construction 3 is a 1.2 mil sealable composite tape, such as DuPont™ Oasis™ 200TRT561, commercially available from E.I. DuPont de Nemours and Company, which is comprised of a 0.65 mil polyimide layer surrounded by a 0.10 mil fluoropolymer layer and a 0.45 fluoropolymer layer.

Sample Wire Test Construction 4

Sample wire test construction 4 is exactly the same as Sample Wire Test Construction 1a, except that the polyimide composite is a 1.2 mil sealable composite tape such as DuPont™ Kapton® 120FN616, commercially available from E.I. DuPont de Nemours and Company, or Kaneka Apical® 120AF616, commercially available from Kaneka Americas Holding, Inc., or FluoroWrap® 120FH616, commercially available from Saint-Gobain Performance Plastics Corporation, which are comprised of a 1.0 mil polyimide layer surrounded by two 0.1 mil fluoropolymer layers.

Sample Wire Test Constructions 5-1 to 5-4

Sample wire test Constructions 5-1 to 5-4 are the same as those conducted in Sample Wire Test Constructions 1 to 4, except that the 2.0 mil thick laser-markable insulation material is wrapped with approximately 67% overlap.

Sample Wire Test Constructions 6-1 to 6-4

Sample Wire Test Constructions 6-1 to 6-4 are the same as those in Sample Wire Test Constructions 1 to 4, except that an additional layer of fluoropolymer-based tape is helically wrapped under the first layer of the laser-markable insulation material.

As described throughout this document, a particular advantage of certain embodiments of the present disclosure is the ability of the insulation material to inhibit electric-arc tracking and propagation, and accordingly, failure of the insulation. The resistance of dielectric insulation in wire and cable assemblies to electric-arc tracking and propagation is currently assessed using several different standard industry test methods, including those designed to test for dry arc tracking and propagation resistance, wet arc tracking and propagation resistance, and wet short-circuit. Three examples of industry standards used to evaluate wet electric-arc tracking and propagation resistance are: EN 3475-605, SAE AS4373E 4.5.9 Method 509, and EN 3475-603. Examples of industry standards used to evaluate dry electric-arc tracking and propagation resistance include SAE AS4373E 4.5.8 Method 508 and EN 3475-604.

Under SAE AS4373E 4.5.9 Method 509 *Wet Arc Propagation Resistance*, a wire passes if the following three criteria are met: 1) a minimum of 67 wires pass the dielectric test; 2) three wires or less fail the dielectric test (SAE AS4373E 4.5.10 Method 510) in any one bundle; and 3) actual damage to the wire is not more than 3 inches in any test bundle.

Under EN 3475-603 *Resistance to Wet Arc Tracking*, 1) a minimum of 75% of collateral wires pass the dielectric voltage proof test (EN 3475-302); and 2) wire damage is no greater than 70 millimeters.

Under EN 3475-605-2010 *Wet Short Circuit Test*, a wire passes if wire damage is no greater than 70 millimeters.

Under SAE AS 4373E 4.5.8 Method 508, *Dry Arc Propagation Resistance*, a wire passes if the following three criteria are met: 1) a minimum of 67 wires pass the dielectric test; 2) three wires or less fail the dielectric test (SAE AS4373E 4.5.10 Method 510) in any one bundle; and 3) actual damage to the wire is not more than 3 inches in any test bundle.

Under EN 3475-604 *Resistance to Dry Arc Propagation*, a wire passes if 1) a minimum of 75% of collateral wires pass the dielectric voltage proof test (EN 3475-302); and 2) wire damage is no greater than 70 millimeters.

Accordingly, in certain embodiments, a sample wire construction containing the insulation material described herein can meet the requirements for wet arc tracking and propagation resistance under any of the standards SAE AS4373E 4.5.9 Method 509, EN 3475-603, and/or EN 3475-605 as tested with any of the Sample Wire Test Constructions provided above.

In further embodiments, a sample wire construction containing the insulation material described herein can meet the requirements for dry electric-arc tracking and propagation resistance under any of the standards SAE AS4373E 4.5.8 Method 508, EN 3475-604, or combinations thereof as tested with any of the Sample Wire Test Constructions provided above.

A particular advantage of certain embodiments of the present disclosure is the ability to meet the standard-test-method requirements for electric-arc tracking and propagation resistance while maintaining or even improving the initial and heat-aged contrast ratios. Accordingly, in certain embodiments, a wire or cable assembly containing the insulation material described herein can be resistant to electric-arc tracking and propagation. As used herein, the phrase "the wire or cable assembly is resistant to electric-arc tracking and propagation" refers to the ability of the wire to pass various industry requirements for electric-arc tracking and propagation resistance. Examples of possible test standards that may be used to determine if a cable or wire assembly is resistant to electric-arc tracking and propagation are provided above. The discovery of a synergistic means for attaining superior contrast ratios, independent of resin grade, while still enabling insulated wires and cables to meet industry requirements for electric-arc tracking and propagation resistance was not anticipated based on current industry perceptions.

EXAMPLES

Examples 1a and 1b

TiO$_2$ pigment and 18-22 pph (of resin weight) Isopar were weighed into a plastic container, which was subsequently placed in an ice bath. The suspension was blended using a Ross high-shear mixer for a period of 10 minutes. The suspension was carefully added to 1 pound of homopolymer PTFE resin in wide-mouthed 0.5 gallon jar that was cooled below 19 degrees Celsius. The mix was passed through a sieve (ASTM E-11 No. 8 with 0.0937 inch opening) to eliminate large clumps and mixed on a jar mill for 20 minutes below 19 degrees Celsius. After incubating at room temperature for 12 hours, the mix was cooled below 19 degrees Celsius and mixed for 5 minutes on a jar mill. After warming to room temperature, the mix was paste extruded to produce 0.1 inch cylindrical beads using a lab-scale paste extruder. The beads were suspended from a rack, and a 33 gram weight was tied to the bottom of each bead to prevent the bead from curling. The beads were sintered at 360 degrees Celsius for 5 minutes in a convection oven.

Contrast-ratio measurements were conducted in accordance with Contrast Ratio Test Construction 1 as discussed above. Heat aging was conducted for 96 hours at 290 degrees Celsius in Examples 1a and 1b. Heat-aging was stopped after 96 hours since heat-aging studies demonstrated that there is no significant change in contrast ratio between 96 and 168 hours of heat aging at 290 degrees Celsius.

The TiO$_2$ pigment used in Example 1a was Altiris 550, which is commercially available from Huntsman Corporation and has a median particle size (d$_{50}$) of about 0.7-0.8 microns and mean crystal size of about approximately 0.6-0.7 microns. The TiO$_2$ pigment in Example 1b was Altiris 800, which is also commercially available from Huntsman and has a median particle size (d$_{50}$) of about 1.0-1.1 and mean crystal size of approximately 0.9-1.0 microns.

The contrast ratio measurements are provided below in Table 1 (pph=parts per hundred of resin; CR=Contrast Ratio).

TABLE 1

|  | Example 1a | Example 1b |
| --- | --- | --- |
| Polymer Matrix | Homopolymer PTFE | Homopolymer PTFE |
| Laser Polymer Pigment | Altiris 550 | Altiris 800 |
| Pigment Loading (pph) | 3.2 | 3.2 |
| Initial CR under CR Test 1 | 65% | 62% |
| Aged CR under CR Test 1 | 56% | 53% |

Examples 2-11

Mixes containing 30 pounds of non-melt-processable perfluoropolymer resin, TiO$_2$ pigment, and 18-22 pph Isopar were prepared in an analogous manner to that in which mixes were prepared on the lab scale in Example 1, except that the TiO$_2$/Isopar suspension was sprayed onto resin tumbling within a rotating panning mixer. After incubating for 12 hours at room temperature, the mix was pressed into preforms to eliminate air voids, and the preforms were extruded in a ram extruder through a flat die. The sheet-like extrudate was calendered to produce a thin film, which was transferred over heated steam cans to evaporate the lubricant. The resulting 50 micron film was slit into narrow strips of tape for testing. The polymer type, TiO$_2$ grade, and TiO$_2$ loading used in Examples 2-8 are listed in Table 2 below.

Contrast ratios were also measured and are reported in Table 1. Contrast-ratio measurements were conducted according to either or both Contrast Ratio Sample Test Constructions 2-5 as described above. Heat-aging was conducted at 290 degrees Celsius for 168 hours.

Examples 12-13

The same process as that used in Examples 2-11 was used in Examples 12-13, except that the resin batch size was 75 pounds. Further, the thickness of the insulation material was 3 mils.

TABLE 2

|  | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
| --- | --- | --- | --- | --- | --- | --- | --- | --- | --- | --- | --- | --- |
| Insulation-material Thickness (mils) | 2.0 | 2.0 | 2.0 | 2.0 | 2.0 | 2.0 | 2.0 | 2.0 | 2.0 | 2.0 | 3.0 | 3.0 |
| Homopolymer PTFE (wt. % of | 40% | 40% | 40% | 100% | — | 40% | 40% | 100% | 40% | 40% | 100% | 40% |

TABLE 2-continued

| | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|
| polymer matrix) Fluorinated Copolymer (wt. % of polymer matrix) | 60% | 60% | 60% | — | 100% | 60% | 60% | — | 60% | 60% | — | 60% |
| Laser Polymer Pigment | Altiris 550 | Altiris 800 | Altiris 550 | Altiris 550 | Altiris 500 | Altiris 550 | Altiris 550 | Altiris 550 | Altiris 550 and R105 | Altiris 550 and R105 | Altiris 550 | Altiris 550 |
| Pigment Loading (pph) | 3.2 | 2.0 | 2.0 | 2.0 | 1.8 | 1.8 | 1.3 | 1.8 | 1.75 of Altiris 550 and 0.05 of R105 | 1.5 of Altiris 550 and 0.5 of R105 | 2.0 | 2.0 |
| Initial CR under CR Test 2 | 63% | — | 64% | 64% | 63% | 59% | 57% | — | 69% | 58% | — | — |
| Aged CR under CR Test 2 | 54% | — | 55% | 53% | 54% | 50% | 47% | — | 54% | 44% | — | — |
| Initial CR under CR Test 3 | — | — | 70% | — | — | — | — | — | 67% | — | — | — |
| Heat-aged CR under CR Test 3 | — | — | 63% | — | — | — | — | — | 60% | — | — | — |
| Initial CR under CR Test 4 | — | — | 68% | — | — | 64% | 62% | — | — | — | — | — |
| Heat-aged CR under CR Test 4 | — | — | 61% | — | — | 55% | 55% | — | — | — | — | — |
| Initial CR under CR Test 5 | 68% | 62% | 66% | — | 69% | 70% | 67% | 69% | — | — | 64% | 64% |
| Heat-aged CR under CR Test 5 | 60% | 54% | 56% | — | 60% | 60% | 57% | 57% | — | — | 55% | 57% |

Comparative Examples

Examples 14-18 were prepared using the same process as Examples 1a and 1b. The TiO$_2$ pigment loading was 3.2 pph, and the polymer matrix was 100% homopolymer PTFE. Contrast ratios were measured in accordance with Contrast Ratio Test 1. The contrast-ratio results, as well as particle and pigment size, are reported in Table 3 below.

TABLE 3

| | Laser Polymer Pigment | Pigment Particle Size (d50) | Pigment Crystal Size (microns) | Initial CR under CR Test 1 | Aged CR under CR Test 1 |
|---|---|---|---|---|---|
| Ex. 14 | DuPont R-900 | 0.4 | <0.4 | 54% | 30% |
| Ex. 15 | DuPont R-960 | 0.5 | <0.5 | 54% | 41% |
| Ex. 16 | Huntsman Tioxide R-XL | <0.5 | 0.3 | 55% | 38% |
| Ex. 17 | Kronos 2800 | 0.5 | <0.5 | 55% | 38% |
| Ex. 18 | Cristal Global RCL 722 | 0.3 | <0.3 | 54% | 40% |

Comparative samples 19-21 were prepared using the same process as that used in Example 2 and measured in accordance with Contrast Ratio Test 5, except that the insulation material was helically wrapped around the stainless steel rod with 67% overlap. The formulations were comprised of a 40:60 blend of homopolymer PTFE and a non-melt-processable perfluorinated copolymer. The variables and results are reported in Table 4 below.

TABLE 4

| | Laser Polymer Pigment | TiO$_2$ level (pph) | Pigment Particle Size (d50) | Pigment Crystal Size (microns) | Initial CR under CR Test 1 | Heat-Aged CR under CR Test 1 |
|---|---|---|---|---|---|---|
| Ex. 19 | Sachtleben R-620 | 3.2 | 0.5 | 0.2 | 54% | 30% |
| Ex. 20 | Sachtleben R405 | 2.8 | 0.2 | 0.3 | 47% | 25% |
| Ex. 21 | DuPont R350 | 3.2 | 0.2 | <0.2 | 48% | 27% |

In Comparative Examples 14-21, initial contrast ratios of at least 56%, and heat-aged contrast ratio of at least 42% were not attainable even at TiO$_2$ loadings as high as 2.8-3.2 pph. In contrast, samples prepared according to the embodiments of this disclosure were all characterized by the combination of an initial contrast ratio of at least above 57% and generally above 65%, and a heat-aged contrast significantly higher than 40% and generally higher than 55%, independent of resin type. Further, such contrast ratios were achievable even at very low TiO$_2$ loadings.

Samples 22-28 were prepared using the same process described for Sample Wire Test Construction 2b and 2c, except that an oven set point of 649 degrees Celsius and a line speed of 60 feet per minute were used in some cases. The slit widths of the tapes are 0.25 inches. Contrast ratios were measured in accordance with Contrast Ratio Test 1. The contrast-ratio results, as well as particle and pigment size, are reported in Table 5 below.

TABLE 5

|  | Resin(s) | TiO2 level (pph) | Polyimide composite | Oven temperature (C.°) | Line speed (fpm) | Initial contrast ratio (%) | Heat-aged contrast ratio (%) |
|---|---|---|---|---|---|---|---|
| Ex. 22 | TF2025z | 2.0 | DF2919WHT | 649 | 60 | 68 | 58 |
| Ex. 23 | 40% T60x | 1.8 | DF2919NAT | 593 | 50 | 65 | 59 |
| Ex. 24 | and | 1.8 | DF2919NAT | 649 | 60 | 67 | 58 |
| Ex. 25 | 60% 613Ax | 1.3 | DF2919WHT | 649 | 60 | 68 | 59 |
| Ex. 26 |  |  | DF2919NAT | 593 | 40 | 63 | 48 |
| Ex. 27 | 40% F104 and | 1.5 | DF2919WHT | 593 | 50 | 66 | 58 |
| Ex. 28 | 60% 613Ax |  | DF2919NAT | 649 | 60 | 67 | 57 |

Wet Electric-Arc Tracking and Propagation Testing

Samples 2-13 and Comparative Samples 19-22 are incorporated into each of the Sample Wire Test Constructions outlined herein, the insulated wires, including examples 22-28, are tested for arc tracking and propagation resistance according to the following standards: (wet) SAE AS4373E 4.5.9 Method 509, EN 3475-603, EN 3475-605; and (dry) SAE AS4373E 4.5.8 Method 508, EN 3475-604. It is expected that when the insulation materials described in Examples 2-14, which all exhibit excellent initial and heat-aged contrast ratios, are incorporated into the various Sample Wire Test constructions outlined herein, at least one and preferably each of the insulated wire constructions will pass at least one and preferably each of the various wet arc and/or dry arc tracking and propagation resistance tests listed above.

Many different aspects and embodiments are possible. Some of these aspects and embodiments are described below. After reading this specification, those skilled in the art will appreciate that these aspects and embodiments are only illustrative and do not limit the scope of the present invention. Embodiments may be in accordance with any one or more of the items as listed below.

Item 1. A laser-markable insulation material comprising:
a. a polymer material comprising a fluoropolymer; and
b. an inorganic laser-markable pigment having a median particle size ($d_{50}$) in a range of about 0.45 microns to about 2 microns.

Item 2. A laser-markable insulation material comprising:
a. a polymer material comprising a fluoropolymer; and
b. an inorganic laser-markable pigment having an mean crystal size in a range of about 0.4 microns to about 2 microns.

Item 3. A laser-markable insulation material comprising:
a. a polymer material comprising a fluoropolymer; and
b. an inorganic laser-markable pigment having an mean crystal size in a range of about 0.4 microns to about 2 microns and/or a median particle size ($d_{50}$) in a range of about 0.45 microns to about 2 microns.

Item 4. A laser-markable insulation material comprising:
a. a polymer material comprising a non-melt-processable fluoropolymer; and
b. an inorganic laser-markable pigment having a ratio of average particle size to average crystal size of no greater than about 2:1.

Item 5. A laser-markable insulation material comprising:
a. a polymer material comprising a fluoropolymer; and
b. an inorganic laser-markable pigment
c. wherein the insulation material has:
  i. an initial contrast ratio of at least about 55% as measured according to Contrast Ratio Sample Test Construction 1, Contrast Ratio Sample Test Construction 2, Contrast Ratio Sample Test Construction 3, Contrast Ratio Test 4, and/or Contrast Ratio Sample Test Construction 5; and/or
  ii. a heat-aged contrast ratio of at least about 42% after aging for 168 hours at a temperature in the range of 290 degrees Celsius to 310 degrees Celsius as measured according to Contrast Ratio Sample Test Construction 1, Contrast Ratio Sample Test Construction 2, Contrast Ratio Sample Test Construction 3, Contrast Ratio Test 4, and/or Contrast Ratio Sample Test Construction 5.

Item 6. A laser-markable insulation material comprising:
a. a polymer material comprising a fluoropolymer; and
b. an inorganic laser-markable pigment
c. wherein the insulation material has:
  i. an initial contrast ratio of at least about 55% as measured according to Contrast Ratio Sample Test Construction 1, Contrast Ratio Sample Test Construction 2, Contrast Ratio Sample Test Construction 3, Contrast Ratio Test 4, and/or Contrast Ratio Sample Test Construction 5; and/or
  ii. a heat-aged contrast ratio of at least about 42% after aging of 168 hours at a temperature in the range of 290 degrees Celsius to 310 degrees Celsius as measured according to Contrast Ratio Sample Test Construction 1; and
d. wherein an insulated wire containing the laser-markable insulation material meets the requirements for wet electric-arc tracking and propagation resistance in accordance with AS4373E 4.5.9 Method 509, EN 3475-603, and/or EN 3475-605 and as tested by forming a sample wire construction containing the laser-markable insulation material according to Sample Wire Test Construction 1*a*, Sample Wire Test Construction 1*b*, Sample Wire Test Construction 2*a*, Sample Wire Test Construction 2*b* Sample Wire Test Construction 3, Sample Wire Test Construction 4, Sample Wire Test Construction 5-1 to 5-4, and/or Sample Wire Test Construction 6-1 to 6-4.

Item 7. A laser-markable insulation material comprising:
a. a polymer material comprising a fluoropolymer; and
b. an inorganic laser-markable pigment
c. wherein the insulation material has:
  i. an initial contrast ratio of at least about 55% as measured according to Contrast Ratio Sample Test Construction 1, Contrast Ratio Sample Test Construction 2, Contrast Ratio Sample Test Construction 3, Contrast Ratio Test 4, and/or Contrast Ratio Sample Test Construction 5; and/or ii. a heat-aged contrast ratio of at least about 42% after aging of 168 hours at a temperature in the range of 290 degrees Celsius to 310 degrees Celsius as measured according to Contrast Ratio Sample Test Construction 1; and d. wherein an insulated wire containing the laser-markable insulation material meets the requirements for dry electric-arc tracking and propagation resistance in accordance with SAE AS 4373E 4.5.8 Method 508, EN 3475-604, or combinations thereof as tested with Sample Wire Test Construction 1a, Sample Wire Test Construction 1b, Sample Wire Test Construction 2a, Sample Wire Test Construction 2b Sample Wire Test Construction 3, Sample Wire Test Construction 4, Sample Wire Test Construction 5-1 to 5-4, and/or Sample Wire Test Construction 6-1 to 6-4.

Item 8. A laser-markable insulation material comprising:
a. a polymer material; and
b. an inorganic laser-markable pigment
c. wherein the laser-markable insulation material has an initial contrast ratio of at least about 55% as measured according to Contrast Ratio Sample Test Construction 1;
d. wherein the laser-markable insulation material has a heat-aged contrast ratio of at least about 42% after aging for 168 hours at a temperature in the range of 290 degrees Celsius to 310 degrees Celsius as measured according to Contrast Ratio Sample Test Construction 1; and
e. wherein an insulated wire containing the laser-markable insulation material is resistant to electric-arc tracking and propagation.

Item 9. The laser-markable insulation material of any one of the preceding items, wherein an insulated wire containing the laser-markable insulation material is resistant to wet electric-arc tracking and propagation and dry electric-arc tracking and propagation.

Item 10. The laser-markable insulation material of any one of the preceding items, wherein the polymer material comprises a perfluoropolymer.

Item 11. The laser-markable insulation material of any one of the preceding items, wherein the polymer material comprises a non-melt-processable polymer material.

Item 12. The laser-markable insulation material of any one of the preceding items, wherein the polymer material comprises a non-melt-processable copolymer material.

Item 13. The laser-markable insulation material of any one of the preceding items, wherein the polymer material comprises or consists essentially of polytetrafluoroethylene (PTFE), non-melt-processable modified PTFE, perfluoroalkoxy copolymer (PFA); ethylene tetrafluoroethylene copolymer (ETFE); polychlorotrifluoroethylene (PCTFE); fluorinated ethylene propylene copolymer (FEP); polyvinylidene fluoride (PVDF); amorphous fluoropolymer (AF); and ethylene chlorotrifluoroethylene (ECTFE); or combinations thereof.

Item 14. The laser-markable insulation material of any one of the preceding items, wherein the polymer material comprises or consists essentially of homopolymer PTFE.

Item 15. The laser-markable insulation material of any one of the preceding items, wherein the polymer material comprises or consists essentially of a fluorinated copolymer.

Item 16. The laser-markable insulation material of any one of the preceding items, wherein the polymer material comprises a non-melt-processable fluorinated copolymer in an amount of no greater than about 80 wt. %, no greater than about 70 wt. %, no greater than about 60 wt. %, no greater than about 50 wt. %, no greater than about 40 wt. %, no greater than about 30 wt. %, no greater than about 25 wt. %, no greater than about 20 wt. %, no greater than about 15 wt. %, no greater than about 10 wt. %, no greater than about 5 wt. %, or even no greater than about 3 wt. % of a fluorinated copolymer, based on the total weight of the polymer material.

Item 17. The laser-markable insulation material of item 13, wherein the non-melt-processable fluorinated copolymer comprises modified PTFE.

Item 18. The laser-markable insulation material of any one of the preceding items, wherein the polymer material comprises or consists essentially of a mixture of a first non-melt-processable resin and a second non-melt-processable resin, and wherein the first and second non-melt-processable resins are different.

Item 19. The laser-markable insulation material of any one of the preceding items, wherein the polymer material comprises or consists essentially of a mixture of homopolymer PTFE and a fluorinated copolymer.

Item 20. The laser-markable insulation material of any one of the preceding items, wherein the polymer material comprises a first non-melt-processable resin and a second non-melt-processable resin, wherein the first and second non-melt-processable resins are different, and wherein a ratio of the first non-melt-processable resin to the second non-melt-processable resin is at least about 1:9, at least about 3:7, at least about 4:6, at least about 5:5, at least about 6:4, or even at least about 8:2.

Item 21. The laser-markable insulation material of any one of the preceding items, wherein the polymer material comprises a mixture of a first non-melt-processable resin and a second non-melt-processable resin, wherein the first and second non-melt-processable resins are different, and wherein a ratio of the first non-melt-proces sable resin to the second non-melt-processable resin is no greater than about 9:1, no greater than about 8:2, no greater than about 6:4, no greater than about 4:6, no greater than about 3:7, or even no greater than about 2:8.

Item 22. The laser-markable insulation material of any one of the preceding items, wherein the polymer material comprises a mixture of a first non-melt-processable resin and a second non-melt-processable resin, wherein the first and second non-melt-processable resins are different, and wherein a ratio of the first non-melt-proces sable resin to the second non-melt-processable resin is in a range of about 1:9 to about 9:1, or even from about 2:8 to about 8:2.

Item 23. The laser-markable insulation material of items 17-19, wherein the first non-melt-processable resin is a homopolymer PTFE resin, and the second non-melt-processable resin is a copolymer PTFE resin.

Item 24. The laser-markable insulation material of any one of the preceding items, wherein the laser-markable pigment comprises or even consists essentially of an inorganic laser-markable pigment.

Item 25. The laser-markable insulation material of any one of the preceding items, wherein the laser-markable pigment is present in the insulation material in an amount of at least about 0.5 pph, at least about 0.8 pph, at least about 1 pph, at least about 1.2 pph, at least about 1.3 pph, or even at least about 1.5 pph.

Item 26. The laser-markable insulation material of any one of the preceding items, wherein the laser-markable pigment is present in the insulation material in an amount of no greater than about 5.0 pph, no greater than about 4.0 pph, no greater than about 3.4 pph, no greater than about 3.2 pph, no greater than about 3.0 pph, no greater than about 2.8 pph, no greater than about 2.6 pph, no greater than about 2.5 pph, or even no greater than about 2.4 pph.

Item 27. The laser-markable insulation material of any one of the preceding items, wherein the laser-markable pigment is present in the insulation material in a range of about 0.5 pph to about 3.0 pph, about 1.0 pph to about 2.8 pph, or even about 1.0 pph to about 2.5 pph.

Item 28. The laser-markable insulation material of any one of the preceding items, wherein the laser-markable pigment comprises or even consists essentially of a metal oxide.

Item 29. The laser-markable insulation material of any one of the preceding items, wherein the laser-markable pigment comprises or even consists essentially of a metal oxide comprises $TiO_2$, $Cr_2O_3$, NiO, $V_2O_5$, $Fe_2O_3$, CuO, CdO, $Tl_2O_3$, $CeO_2$, $Nb_2O_5$, $MoO_3$, $WO_3$, $Sb_2O_3$, $SnO_2$, ZrO, $ZnO_2$, or combinations thereof.

Item 30. The laser-markable insulation material of any one of the preceding items, wherein the laser-markable pigment comprises or even consists essentially of $TiO_2$, doped $TiO_2$, or combinations thereof.

Item 31. The laser-markable insulation material of any one of the preceding items, wherein the laser-markable pigment comprises or even consists essentially of rutile $TiO_2$.

Item 32. The laser-markable insulation material of any one of the preceding items, wherein the laser-markable pigment comprises a non-metal-oxide, such as ZnS, CdS, cadmium sulfoselenide, and/or cerium sulfide.

Item 33. The laser-markable insulation material of any one of the preceding items, wherein the laser-markable pigment has a median particle size ($d_{50}$) of at least 0.4 microns, at least about 0.45 microns, at least about 0.5 microns, at least about 0.6 microns, at least about 0.7 microns, or even at least about 0.8 microns.

Item 34. The laser-markable insulation material of any one of the preceding items, wherein the laser-markable pigment has a median particle size ($d_{50}$) of no greater than about 3 microns, no greater than about 2.5 microns, no greater than about 2.0 microns, no greater than about 1.8 microns, no greater than about 1.6 microns, no greater than about 1.4 microns, no greater than about 1.2 microns, no greater than about 1 micron, or even no greater than about 0.8 microns.

Item 35. The laser-markable insulation material of any one of the preceding items, wherein the laser-markable pigment has a median particle size ($d_{50}$) in a range of about 0.5 microns to about 3.0 microns, about 0.5 microns to about 2.5 microns, about 0.5 microns to about 1.8 microns, or even about 0.6 microns to about 1.6 microns.

Item 36. The laser-markable insulation material of any one of the preceding items, wherein the laser-markable pigment has a crystal size of at least about 0.4 microns, at least about 0.5 microns, or even at least about 0.6 microns.

Item 37. The laser-markable insulation material of any one of the preceding items, wherein the laser-markable pigment has a mean crystal size of no greater than about 2.0 microns, no greater than about 1.5 microns, no greater than about 1.3 microns, no greater than about 1.1 microns, no greater than about 0.9 microns, no greater than about 0.8 microns, or even no greater than about 0.7 microns.

Item 38. The laser-markable insulation material of any one of the preceding items, wherein the laser-markable pigment has a mean crystal size in a range of from about 0.3 microns to about 2.0 microns, about 0.4 microns to about 1.5 microns, or even about 0.5 to about 0.8 microns.

Item 39. The laser-markable insulation material of any one of the preceding items, wherein the laser-markable pigment has a ratio of particle size to crystal size of no greater than about 3:1, no greater than about 2:1, no greater than about 1.8:1, no greater than about 1.6:1, no greater than about 1.4:1, no greater than about 1.3:1, or even no greater than about 1.2:1.

Item 40. The laser-markable insulation material of any one of the preceding items, wherein the laser-markable particles comprises a coating.

Item 41. The laser-markable insulation material of any one of the preceding items, wherein the laser-markable particles comprises a silica-based coating, a metal-based coating, oxides thereof, or combinations thereof.

Item 42. The laser-markable insulation material of any one of the preceding items, wherein the laser-markable particles comprises a coating comprising silicon oxide, aluminum oxide, or combinations thereof.

Item 43. The laser-markable insulation material of any one of the preceding items, wherein the laser-markable particles are essentially free of a coating that degrades at the sintering temperature of the polymer matrix material.

Item 44. The laser-markable insulation material of any one of the preceding items, wherein the insulation material is essentially free of a material that degrades at the sintering temperature of the polymer matrix material.

Item 45. The laser-markable insulation material of any one of the preceding items, wherein the insulation material is essentially free of a material that degrades at temperatures generated by scintillations during an arc-event.

Item 46. The laser-markable insulation material of any one of the preceding items, wherein the particle size of the laser-markable pigment is reduced by air-jet milling.

Item 47. The laser-markable insulation material of any one of the preceding items, wherein the fluoropolymer resin is subjected to air-jet milling.

Item 48. The laser-markable insulation material of any one of the preceding items, wherein the mixture of the fluoropolymer resin and the inorganic laser-markable pigment is subjected to air-jet milling.

Item 49. The laser-markable insulation material of any one of the preceding items, wherein the laser-markable pigment is dry milled.

Item 50. The laser-markable insulation material of any one of the preceding items, wherein the inorganic laser-markable pigment is not dispersed within the polymer material using air-jet milling techniques.

Item 51. The laser-markable insulation material of any one of the preceding items, wherein the laser-markable insulation material further includes an additional pigment adapted to improve the luminescence of the polymer material, wherein the additional pigment is different from the laser-markable pigment.

Item 52. The laser markable insulation material of any one of the preceding items, wherein the laser-markable insulation material further includes an additional conventional white pigment, and wherein the additional pigment is different from the first laser-markable pigment.

Item 53. The laser-markable insulation material of any one of the preceding items, wherein the laser-markable insulation material further includes an additional pigment comprising titanium dioxide, doped titanium dioxide, or combinations thereof.

Item 54. The laser-markable insulation material of any one of the preceding items, wherein the laser-markable insulation material further includes an additional pigment adapted to improve the luminescence of the polymer material, and wherein the additional pigment is present in the laser markable insulation material in an amount of at least about 0.01 pph, at least about 0.05 pph, or even at least about 0.1 pph.

Item 55. The laser-markable insulation material of any one of the preceding items, wherein the laser-markable insulation material further includes an additional pigment adapted to improve the luminescence of the polymer material, and wherein the additional pigment is present in the laser-markable insulation material in an amount of no greater than about 1 pph, no greater than about 0.8 pph, or even no greater than about 0.5 pph.

Item 56. The laser-markable insulation material of any one of the preceding items, wherein the laser-markable insulation material further includes an additional pigment adapted to improve the luminescence of the polymer material, and wherein the additional pigment is present in the laser markable insulation material in a range of from about 0.01 pph to about 1 pph, about 0.05 pph to about 0.8 pph, or even about 0.1 pph to about 0.5 pph.

Item 57. The laser-markable insulation material of any one of the preceding items, wherein the insulation material has an average (nominal) thickness of at least about 0.0005 inches, at least about 0.001 inches, or even at least about 0.0015 inches.

Item 58. The laser-markable insulation material of any one of the preceding items, wherein the insulation material has an average (nominal) thickness of no greater than about 0.005 inches, no greater than about 0.004 inches, no greater than about 0.003 inches, or even no greater than about 0.002 inches.

Item 59. The laser-markable insulation material of any one of the preceding items, wherein the insulation material has an average (nominal) thickness in a range of about 0.0005 inches to about 0.004 inches, about 0.001 inches to about 0.003 inches or even about 0.0015 inches to about 0.0025 inches.

Item 60. The laser-markable insulation material of any one of the preceding items, wherein the insulation material has an initial contrast ratio of at least about 55%, at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, or even at least about 75% as measured according to Contrast Ratio Sample Test Construction 1, Contrast Ratio Sample Test Construction 2, Contrast Ratio Sample Test Construction 3, Contrast Ratio Sample Test Construction 4, and/or Contrast Ratio Sample Test Construction 5.

Item 61. The laser-markable insulation material of any one of the preceding items, wherein the insulation material has an initial contrast ratio of no greater than about 99%, no greater than about 90%, or even no greater than about 85% as measured according to Contrast Ratio Sample Test Construction 1, Contrast Ratio Sample Test Construction 2, Contrast Ratio Sample Test Construction 3, Contrast Ratio Sample Test Construction 4, and/or Contrast Ratio Sample Test Construction 5.

Item 62. The laser-markable insulation material of any one of the preceding items, wherein the insulation material has an initial contrast ratio in a range of about 55% to about 99%, about 60% to about 99%, about 65% to about 90%, or even about 70% to about 90% as measured according to Contrast Ratio Sample Test Construction 1, Contrast Ratio Sample Test Construction 2, Contrast Ratio Sample Test Construction 3, Contrast Ratio Sample Test Construction 4, and/or Contrast Ratio Sample Test Construction 5.

Item 63. The laser-markable insulation material of any one of the preceding items, wherein the insulation material has a heat-aged contrast ratio after aging for 168 hours at a temperature in the range of 290 degrees Celsius to 310 degrees Celsius of at least about 40%, at least about 41%, at least about 42%, at least about 43%, at least about 44%, at least about 45%, at least about 46%, at least about 47%, at least about 48%, at least about 49%, at least about 50%, at least about 51%, at least about 52%, at least about 53%, at least about 54%, at least about 55%, at least about 56%, at least about 57%, at least about 58%, at least about 59%, or even at least about 60% as measured according to Contrast Ratio Sample Test Construction 1, Contrast Ratio Sample Test Construction 2, Contrast Ratio Sample Test Construction 3, Contrast Ratio Sample Test Construction 4, and/or Contrast Ratio Sample Test Construction 5.

Item 64. The laser-markable insulation material of any one of the preceding items, wherein the insulation material has a heat-aged contrast ratio after aging for 168 hours at a temperature in the range of 290 degrees Celsius to 310 degrees Celsius of no greater than about 99%, no greater than about 90%, or even no greater than about 85% as measured according to Contrast Ratio Sample Test Construction 1, Contrast Ratio Sample Test Construction 2, Contrast Ratio Sample Test Construction 3, Contrast Ratio Sample Test Construction 4, and/or Contrast Ratio Sample Test Construction 5.

Item 65. The laser-markable insulation material of any one of the preceding items, wherein the insulation material has a heat-aged contrast ratio after aging for 168 hours at a temperature in the range of 290 degrees Celsius to 310 degrees Celsius in a range of about 40% to about 99%, about 45% to about 90%, or even about 50% to about 90% as measured according to Contrast Ratio Sample Test Construction 1, Contrast Ratio Sample Test Construction 2, Contrast Ratio Sample Test Construction 3, Contrast Ratio Sample Test Construction 4, and/or Contrast Ratio Sample Test Construction 5. The laser-markable insulation material of any one of the preceding items, wherein the insulation material passes wet arc track resistance and propagation under AS4373E 4.5.9 Method 509, EN 3475-603, and/or EN 3475-605 as tested with Sample Wire Test Construction 1*a*, Sample Wire Test Construction 1*b*, Sample Wire Test Construction 2*a*, Sample Wire Test Construction 2*b* Sample Wire Test Construction 3, Sample Wire Test Construction 4, Sample Wire Test Construction 5-1 to 5-4, and/or Sample Wire Test Construction 6-1 to 6-4.

Item 66. The laser-markable insulation material of any one of the preceding items, wherein the insulation material passes dry arc track resistance and propagation under any of the standards SAE AS 4373 4.5.8 Method 508, EN 3475-604, or combinations thereof as tested with Sample Wire Test Construction 1*a*, Sample Wire Test Construction 1*b*, Sample Wire Test Construction 2*a*, Sample Wire Test Construction 2*b* Sample Wire Test Construction 3, Sample Wire Test Construction 4, Sample Wire Test Construction 5-1 to 5-4, and/or Sample Wire Test Construction 6-1 to 6-4.

Item 67. The laser-markable insulation material of any one of the preceding items, wherein the insulation material is unsintered prior to its incorporation into a wire or cable assembly.

Item 68. The insulation material of any one of the preceding items, wherein the insulation material is adapted to form an outer insulation member in a wire or cable assembly.

Item 69. The insulation material of any one of the preceding items, wherein the insulation material is formed by coating, melt extrusion, skiving, paste extrusion, or combinations thereof.

Item 70. The insulation material of any one of the preceding items, wherein the insulation material is formed by paste extrusion.

Item 71. A subcomponent of a wire or cable assembly comprising the insulation material of any one of the preceding items.

Item 72. A wire or cable assembly comprising the insulation material of any one of the preceding items.

Item 73. A wire or cable assembly comprising a laser-markable insulation material comprising:
a. a polymer material; and
b. an inorganic laser-markable pigment
c. wherein:
  i. the wire or cable assembly has an initial contrast ratio of at least about 55%; and/or
  ii. the wire or cable assembly has a heat-aged contrast ratio of at least about 42% after aging for 168 hours at a temperature in the range of 290 degrees Celsius to 310 degrees Celsius; and/or
  iii. the wire or cable assembly is resistant to electric-arc tracking and propagation.

Item 74. The cable or wire assembly of any one of the preceding items, wherein the cable or wire assembly comprises a transmission member, a first insulation member wrapped around the transmission member, and a second insulation member wrapped around the wrapped first insulation member, and wherein the second insulation member comprises the insulation material of any one of the preceding items.

It should be noted that not all of the activities described above within the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A laser-markable insulation material comprising:
a fluoropolymer; and
an inorganic laser-markable pigment having a mean crystal size of at least 0.5 microns and not greater than 1 microns and a median particle size ($d_{50}$) of greater than 0.5 microns and not greater than 1.1 microns.

2. The laser-markable insulation material of claim 1, wherein the inorganic laser-markable pigment has a ratio of average particle size to average crystal size not greater than 2:1.

3. The laser-markable insulation material of claim 1, wherein the insulation material has an initial contrast ratio of at least 55% as measured according to Contrast Ratio Sample Test Construction 1; and a heat-aged contrast ratio of at least 42% after aging for 168 hours at a temperature in the range of 290 degrees Celsius to 310 degrees Celsius as measured according to Contrast Ratio Sample Test Construction 1.

4. The laser-markable insulation material of claim 3, wherein an insulated wire containing the laser-markable insulation material is resistant to wet electric-arc tracking and propagation and dry electric-arc tracking and propagation.

5. The laser-markable insulation material of claim 1, wherein the fluoropolymer comprises a perfluoropolymer.

6. The laser-markable insulation material of claim 1, wherein the fluoropolymer comprises polytetrafluoroethylene (PTFE), non-melt-processable modified PTFE, perfluoroalkoxy copolymer (PFA); ethylene tetrafluoroethylene copolymer (ETFE); polychlorotrifluoroethylene (PCTFE); fluorinated ethylene propylene copolymer (FEP); polyvinylidene fluoride (PVDF); amorphous fluoropolymer (AF); or ethylene chlorotrifluoroethylene (ECTFE).

7. The laser-markable insulation material of claim 1, wherein the fluoropolymer comprises homopolymer PTFE.

8. The laser-markable insulation material of claim 1, wherein the polymer material comprises a fluorinated copolymer.

9. The laser-markable insulation material of claim 1, wherein the laser-markable pigment consists essentially of an inorganic laser-markable pigment.

10. The laser-markable insulation material of claim 1, wherein the laser-markable pigment is present in the insulation material in a concentration of at least 0.5 pph and not greater than 4.0 pph.

11. The laser-markable insulation material of claim 1, wherein the laser-markable pigment comprises a metal oxide comprising $TiO_2$, $Cr_2O_3$, NiO, $V_2O_5$, $Fe_2O_3$, CuO, CdO, $Tl_2O_3$, $CeO_2$, $Nb_2O_5$, $MoO_3$, $WO_3$, $Sb_2O_3$, $SnO_2$, ZrO, or $ZnO_2$.

12. The laser-markable insulation material of claim 1, wherein the laser-markable pigment comprises a non-metal-oxide.

13. The laser-markable insulation material of claim 1, wherein the laser-markable pigment has a ratio of particle size to crystal size not greater than 1.4:1.

14. The laser-markable insulation material of claim 1, wherein the laser-markable particles are essentially free of a coating that degrades at the sintering temperature of the fluoropolymer.

15. The laser-markable insulation material of claim 1, wherein the insulation material has an average (nominal) thickness of at least 0.0005 inches and not greater than 0.004 inches.

16. The laser-markable insulation material of claim 1, wherein the insulation material has an initial contrast ratio of at least 60%, as measured according to Contrast Ratio Sample Test Construction 1.

17. The laser-markable insulation material of claim 1, wherein the insulation material has a heat-aged contrast ratio after aging for 168 hours at a temperature in the range of 290 degrees Celsius to 310 degrees Celsius of at least 42% as measured according to Contrast Ratio Sample Test Construction 1.

18. A subcomponent of a wire or cable assembly comprising the insulation material of claim 1.

* * * * *